United States Patent
Ziarniak et al.

(10) Patent No.: US 7,483,260 B2
(45) Date of Patent: Jan. 27, 2009

(54) DUAL ANODE CAPACITOR WITH INTERNALLY CONNECTED ANODES

(75) Inventors: Christopher J. Ziarniak, Akron, NY (US); Rodney E. Stringham, Corfu, NY (US); Barry C. Muffoletto, Alden, NY (US); Douglas Eberhard, Grand Island, NY (US); Joseph E. Spaulding, Williamsville, NY (US); Yanming Liu, Clarence Center, NY (US); Donald Monroe, Corfu, NY (US); Edward J. Gloss, Clarence, NY (US); Laurie O'Connor, East Aurora, NY (US); Eric Ziarniak, Alden, NY (US); William B. Elliott, Alden, NY (US); Eric Stemen, Roseville, MN (US); Troy Lindke, Gasport, NY (US)

(73) Assignee: Greatbatch Ltd., Clarence, NY (US)

( * ) Notice: Subject to any disclaimer, the term of this patent is extended or adjusted under 35 U.S.C. 154(b) by 228 days.

(21) Appl. No.: 11/615,410

(22) Filed: Dec. 22, 2006

(65) Prior Publication Data

US 2008/0151474 A1    Jun. 26, 2008

(51) Int. Cl.
 *H01G 5/38* (2006.01)
 *H01G 9/04* (2006.01)
(52) U.S. Cl. .................. 361/541; 361/508; 361/516; 29/25.03
(58) Field of Classification Search ........... 361/541, 361/522, 529, 508–509, 516–517, 520
See application file for complete search history.

(56) References Cited

U.S. PATENT DOCUMENTS

| | | | |
|---|---|---|---|
| 5,043,849 A | * | 8/1991 | Libby ................... 361/516 |
| 5,926,362 A | * | 7/1999 | Muffoletto et al. ........ 361/503 |
| 6,099,600 A | | 8/2000 | Yan et al. |
| 6,321,114 B1 | | 11/2001 | Nutzman et al. |
| 6,451,473 B1 | | 9/2002 | Saito et al. |
| 6,459,566 B1 | | 10/2002 | Casby et al. |
| 6,467,156 B1 | | 10/2002 | Velasquez et al. |
| 6,660,429 B2 | | 12/2003 | O'Connell |
| 6,679,926 B1 | | 1/2004 | Kajiura et al. |
| 6,807,048 B1 | * | 10/2004 | Nielsen et al. ............ 361/520 |
| 6,850,405 B1 | | 2/2005 | Mileham et al. |

(Continued)

FOREIGN PATENT DOCUMENTS

EP    0877400 A1    11/1998

(Continued)

OTHER PUBLICATIONS

European Search Report, dated Mar. 18, 2008.

*Primary Examiner*—Eric Thomas
(74) *Attorney, Agent, or Firm*—Michael F. Scalise

(57) ABSTRACT

A capacitor a casing of first and second casing members, a feedthrough electrically insulated from the casing and extending there from, first and second anodes electrically connected to each other within the casing, a cathode, and an electrolyte is described. The first anode is electrically connected in parallel to the second anode by a first anode wire having opposite ends contacting the respective first and second anodes. A feedthrough wire extending outside the casing and electrically isolated there from is electrically connected to the first anode wire intermediate the first and second anodes. The cathode is disposed between the first and second anodes.

34 Claims, 10 Drawing Sheets

U.S. PATENT DOCUMENTS

| | | | |
|---|---|---|---|
| 7,092,242 B1 * | 8/2006 | Gloss et al. | 361/523 |
| 7,271,994 B2 * | 9/2007 | Stemen et al. | 361/508 |
| 2002/0108221 A1 | 8/2002 | Miltich et al. | |
| 2003/0056350 A1 | 3/2003 | Yan et al. | |
| 2003/0088293 A1 | 5/2003 | Clarke et al. | |
| 2004/0019268 A1 | 1/2004 | Schmidt et al. | |
| 2005/0117280 A1 | 6/2005 | Audo | |
| 2005/0190530 A1 * | 9/2005 | Muffoletto et al. | 361/517 |
| 2006/0262486 A1 | 11/2006 | Tadanobu et al. | |
| 2006/0279906 A1 * | 12/2006 | Stemen et al. | 361/517 |

FOREIGN PATENT DOCUMENTS

| | | |
|---|---|---|
| EP | 1431990 A2 | 6/2004 |
| EP | 1592031 A1 | 11/2005 |

* cited by examiner

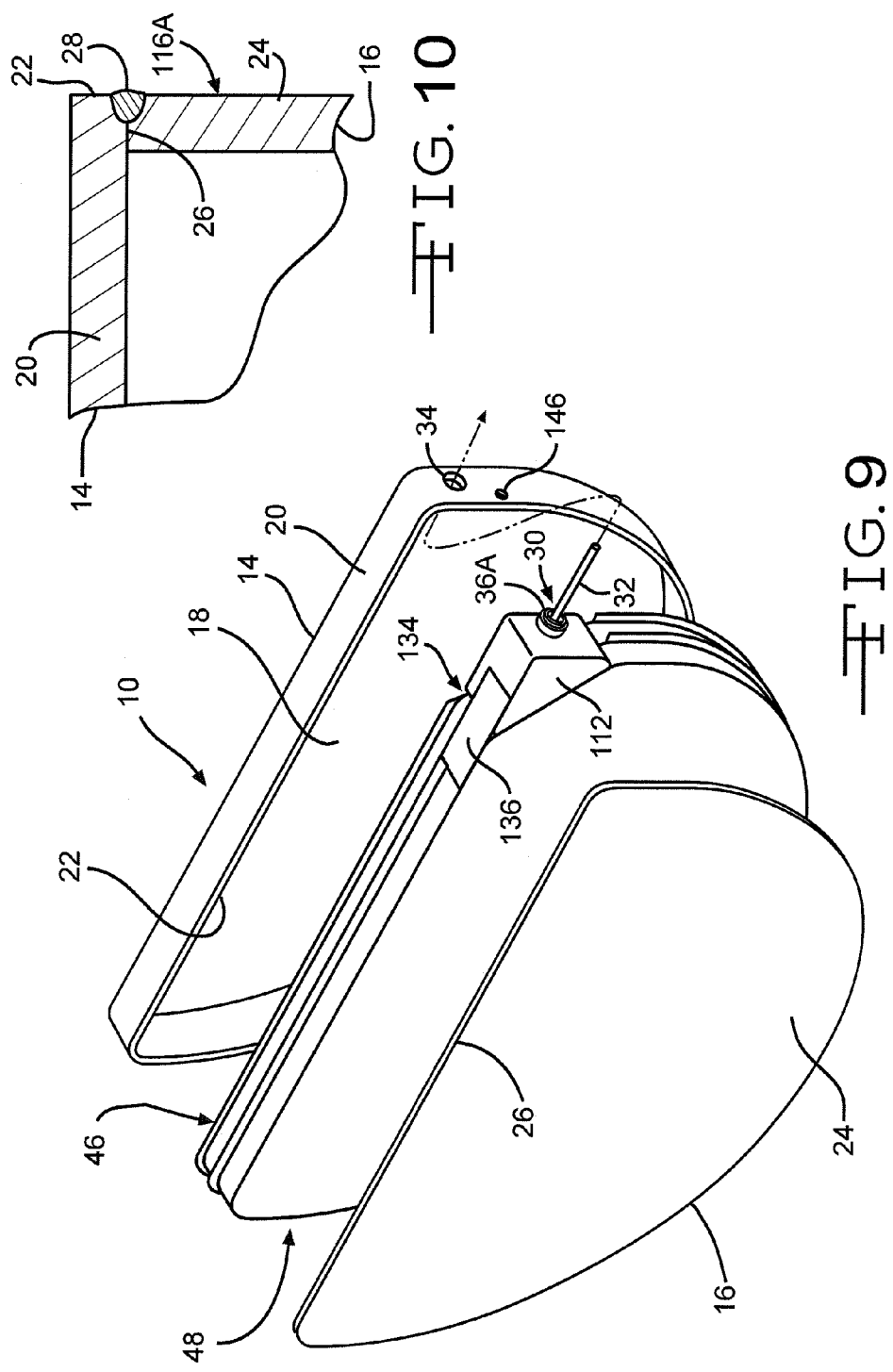

DUAL ANODE CAPACITOR WITH INTERNALLY CONNECTED ANODES

BACKGROUND OF THE INVENTION

1. Field of the Invention

The present invention generally relates to a capacitor and, more particularly, to a capacitor containing at least two anodes that are connected to a common terminal within the capacitor casing.

2. Description of Related Art

As more and more medical applications are investigated and implemented to aid and assist the human body, devices needed to deliver the desired therapy are becoming increasingly more sophisticated, both functionally and in terms of their structural makeup. Modern implantable devices require power sources that are smaller in size, but powerful enough to meet the therapy requirements. For example, a cardiac defibrillator has a battery powering circuits performing such functions as, for example, the heart sensing and pacing functions. This requires electrical current of about 1 microampere to about 100 milliamperes. From time-to-time, the cardiac defibrillator may require a generally high rate, pulse discharge load component that occurs, for example, during charging of a capacitor assembly in the defibrillator for the purpose of delivering an electrical shock to the heart to treat tachyarrhythmias, the irregular, rapid heartbeats that can be fatal if left uncorrected. This requires electrical current of about 1 ampere to about 4 amperes.

The current trend in medicine is to make cardiac defibrillators, and like implantable devices, as small and lightweight as possible without compromising their power. This, in turn, means that capacitors contained in these devices must be readily adaptable in how they are connected to each other as well as to the battery and the device circuitry. In that light, a number of patents and publications disclose electrical energy storage devices including capacitors having a dual anode structure.

One is U.S. Pat. No. 6,850,405 to Mileham et al., which is assigned to the assignee of the present invention and incorporated herein by reference. This patent relates to a design that provides two anodes and their associated feedthroughs incorporated into one capacitor. The feedthrough wires can be in their own glass-to-metal seal or, they can be combined into one glass-to-metal seal as long as they are electrically insulated from each other. One embodiment has the two anode feedthrough wires left unconnected outside the capacitor. In another, they are joined externally of the capacitor casing. Several interconnect designs are described, none of which include a connection of the anode leads within the capacitor casing.

U.S. Pat. No. 7,012,799 to Muffoletto et al., which is also assigned to the assignee of the present invention and incorporated herein by reference, describes an enclosure for a wet tantalum electrolytic capacitor or for an electrochemical cell such as a lithium/silver vanadium oxide cell. In one embodiment, the capacitor comprises a metallic enclosure of a first drawn portion, and a second stamped cover. The enclosure houses two anodes in a side-by-side relationship. Each anode includes an embedded anode wire weld contacted to an anode lead that is electrically insulated from the casing by a glass-to-metal seal. The anode wires are not connected within the capacitor casing.

U.S. Pat. No. 6,679,926 to Kajiura et al., which is incorporated herein by reference, describes a lithium secondary battery including a cathode of a porous sintered material made of a lithium-transition metal oxide in electrochemical association with several pairs of anodes made of a sintered material joined onto a rectangular anode current collector. The anode current collector has a strip-shaped anode lead that protrudes at one end thereof. In an electrode assembly, a plurality of extending anode leads is bundled into an anode-connecting conductor, which is welded onto an anode terminal via an insulation plate.

More specifically, Kajiura et al. relates to a battery having multiple rectangular or square anodes and cathodes that are stacked in a generally alternating arrangement. In the various battery embodiments, the multiple anodes are interconnected with a strip shaped anode current collector, and the multiple cathodes are also interconnected with a strip shaped cathode current collector. The sections of anode or cathode current collector that are provided between the planar rectangles of anode or cathode are flexible. This enables stacking sequences of cathodes in a serpentine manner or rolling the cathodes in a jellyroll configuration. The anodes are interspersed therebetween in both embodiments.

At numerous instances in the Kajiura et al. patent, the importance of precisely aligning the series of anodes and cathodes in a layered sequence to achieve a battery of high capacity is emphasized. For example, at column 2, lines 28 to 46, it is disclosed that, "[w]hen an electrode unit consisting of one sintered cathode and one sintered anode is to be assembled, for example, both electrodes can be easily aligned with each other simply by stacking the cathode and the anode to oppose each other while interposing a separator therebetween. However, when a battery having an electrode unit consisting of a number of pairs of cathode and anode is to be assembled for the purpose of achieving a large battery capacity, a plurality of cathodes and anodes must be accurately aligned to oppose each other via separators. This leads to a longer period of time for stacking the electrodes and the electrode unit, or requires it to use a high precision apparatus for alignment. Also there has been such a problem that, when moving a stacking electrode unit or housing the stacking electrode unit in a battery casing after the stacking process, the electrodes are shifted from the predetermined positions, thus leading to a decrease in the area over which the mating electrodes face each other, and resulting in a decrease in the battery capacity of the completed battery." One object of the Kajiura et al. invention is "to provide a lithium battery that comprises the electrode made of a plurality of sintered materials, where the cathodes and the anodes will not be shifted from the predetermined positions and high reliability is ensured." Kajiura et al. repeatedly teach cathode and anode structures wherein the current collectors are rectangular strips of material. For example, with reference to FIG. 1A in this patent, at column 10, lines 32 to 48, it is disclosed that, "[t]he cathode sheet 2 comprises a strip-shaped cathode current collector 4 and a plurality of cathodes 3 made of sintered material aligned on and joined to one side of thereof. The plurality of cathodes 3 are joined while being spaced from one another at a plurality of bending portions 5 that secure spaces required for bending and are defined by desirable intervals on the cathode current collector 4. The anode sheet 6 has a structure similar to that of the cathode 2, including a strip-shaped anode current collector 8 and a plurality of anodes 7 made of sintered material aligned on and joined to one side of thereof, the plurality of anodes 7 being joined while being spaced from one another at a plurality of bending portions 10 defined by desirable intervals on the anode current collector 8. In the anode sheet 6, one end of the strip-shaped anode current collector 8 is stretched in the longitudinal direction to form the anode lead 9."

With reference to FIG. 3D, at column 12, lines 9 to 21, it is disclosed that, "[f]or the anodes, for example, a pair of anodes 7 made of the sintered material joined onto a rectangular anode current collector 8' may be used. The anode current collector 8' has the strip-shaped anode lead 9 that protrudes at one end thereof. The plurality of anode leads 9 extending from the front end of the stacked electrode 15 is bundled into an anode-connecting conductor 12 (FIG. 3D). Then the anode connecting conductor 12 is welded onto the anode terminal 20 via an insulation plate 16, while the stacked electrode 15 is housed in the can 17 so that the rear end of the stacked electrode 15 and the cathode current collector on the outermost layer make contact with the bottom and the wall of the can 17 (FIG. 1E). The subsequent process to complete the battery is similar to the case of the first embodiment (FIG. 3F). An anode sheet that includes a plurality of anodes made of sintered material may be used instead of the cathode sheet, and sintered cathodes may be used instead of the sintered anodes. In the battery C, since the sintered electrode sheet is folded after covering the sintered electrodes, the electrodes can be aligned easily and displacement of the electrodes can be prevented."

It is apparent from the teachings of Kajiura et al. that the flexible regions of the anode and cathode current collectors not only provide electrical continuity between the rectangular anode and cathode plates, but these regions also serve a critical function in achieving and maintaining alignment of the cathode and anode plates in order to provide a battery of high capacity. The flexed regions, which are typically bent 180 degrees within the battery casing, have lines of contact along the upper and lower ends of the battery casing, and the outer edges that extend beyond the lateral boundaries of the anodes and cathodes are also in contact with, or in close proximity to the lateral walls of the battery casing. This compact geometrical configuration thus constrains the anodes and the cathodes within the battery casing. It prevents any significant motion of these electrodes relative to each other, which could misalign the electrodes and reduce the battery capacity. The only instance in which a wire conductor is connected to the anodes or cathodes is at an end point of the strip shaped current collector, where a termination is needed for connection to one of the battery terminals.

It is apparent that were Kajiura et al. to use individual wire connectors between the anode and/or cathode plates in lieu of the flexible strip shaped regions, the ability to easily align the anodes and cathodes in a stacked configuration during battery fabrication, and to maintain the critical alignment during battery use would be lost. Such a battery would thus be rendered unsuitable for its intended purpose.

Additionally, Kajiura et al. provide teachings regarding preparation of the anodes and cathodes by pressing and sintering active materials, or by coating active materials on the current collectors. For each of these fabrication methods, the use of intermittent current collector strips connected by wire bridges would result in additional challenges. Sintering requires uniform heat transfer, which is problematic with a discontinuous substrate. The coating of small substrate surfaces that are wire bonded either before or after coating is considerably more difficult than coating a continuous strip of material.

Thus, the Kajiura et al. patent does not show or suggest an electrical energy storage device in which the individual anode or cathode plates are connected by a wire or by a narrow strip of material having opposed planar surfaces that do not extend laterally beyond edges of the anode or cathode plates. To the contrary, Kajiura et al. teach away from such a device structure.

Additionally, none of the references cited above disclose an electrical energy storage device including at least two anodes that are connected to a common terminal within the capacitor casing.

SUMMARY OF THE INVENTION

Accordingly, embodiments of the present invention are provided that meet at least one or more of the following objects:

It is an object of this invention to provide a dual anode capacitor connected by a common lead within the capacitor casing, thereby eliminating the need for multiple feedthroughs being provided within the capacitor.

It is a further object of this invention to provide a dual anode capacitor connected by a common lead within the capacitor casing, thereby requiring only a single joining operation to connect the anodes to a feedthrough of the capacitor.

According to the present invention, therefore, a capacitor is provided comprising a casing of first and second casing members, a feedthrough electrically insulated from the casing and extending outside the casing, first and second anodes, a cathode, and an electrolyte. The first casing member has a first face wall joined to a surrounding side wall, and the second casing member comprises a second face wall in the form of a plate. The casing is formed by joining the second plate to the first surrounding sidewall.

The first anode is housed within the casing and comprises a first pellet of anode active material comprising inner and outer major face walls and including a first wire extending there from and electrically connected within the casing to the feedthrough. The second anode is also housed within the casing and comprises a second pellet of anode active material comprising inner and outer major face walls and including a second wire extending there from and electrically connected within the casing to the first pellet of anode active material. Preferably a proximal end of the first and second wires is embedded in the respective anode pellets.

The cathode comprises cathode active material supported by and in contact with the first face wall of the first casing member and the face wall of the second casing plate. A first cathode current collector is disposed between the first and second anodes. The first cathode current collector has opposed first and second major faces supporting cathode active material and positioned opposite the first and second anodes. A working electrolyte contacts the cathode active material and the first and second anodes. A glass-to-metal seal electrically insulates the feedthrough wire from the casing.

Within the capacitor casing, the first anode wire does not extend laterally beyond the inner and outer major face walls thereof, and the second anode wire does not extend laterally beyond the outer major face wall of the second anode pellet and the outer major face wall of the first anode pellet. The second anode wire is electrically connected to the feedthrough. This serves to directly connect both anode pellets to the feedthrough in a serial manner. The second anode wire may be a separate structure from the first anode wire although each is in continuity with the feedthrough through the serial anodes. Alternatively, the anode wires are a continuous structure embedded in the first and second pellets and connected to the feedthrough. For this latter embodiment, the anode pellets are connected to the feedthrough in parallel. In another embodiment in which the anode pellets are connected to the feedthrough in series, the second anode wire is not connected to the feedthrough or to the first anode wire. Instead, it is connected only to the first anode pellet.

The capacitor may further comprise a first separator enclosing the first anode pellet and a second separator enclosing the second anode pellet. The separators may be formed as pouches that enclose the anode pellets. In a further embodiment, the first anode wire extending from the first anode pellet, the second anode wire extending from the second anode pellet, and at least a portion of the glass-to-metal seal (GTMS) are enclosed in a molded polymeric material.

The capacitor of the present invention is not limited solely to a dual anode structure. The capacitor may comprise additional anodes and cathode current collectors including cathode active material on the faces thereof. For example, in a three anode configuration, the capacitor comprises a third anode housed within the casing. A third pellet of anode active material includes a third anode wire extending therefrom and electrically connected within the casing to the second anode pellet. A second cathode current collector is disposed between the second and third anodes. The second cathode current collector has opposed first and second major faces provided with cathode active material and positioned opposite the second and third anodes.

Also according to the present invention, a method for making a capacitor comprises the steps of providing a casing comprising a first casing member and a second casing member. Each of the casing members includes a face wall supporting and in contact with a cathode active material. An anode assembly comprises a first anode pellet of anode active material including a first anode wire extending therefrom and electrically connected to a feedthrough. A second anode comprises a second pellet of anode active material including a second anode wire extending therefrom and electrically connected to the first anode pellet. A current collector having opposed first and second major faces provided with cathode active material is disposed between the first anode pellet and the second anode pellet. This forms an anode-cathode assembly that is positioned inside the first casing member with the feedthrough extending out through an opening in the side wall thereof in a hermetic, but insulating relationship. The cathode current collector supporting the cathode active material is electrically connected to the first casing member. The first casing member is hermetically secured to the second casing member to provide an enclosure containing the anode-cathode assembly. Finally, a working electrolyte is provided inside the casing to operatively associate the cathode with the first and second anodes. The step of electrically connecting the current collector to the first casing member may be performed by spot welding a tab on the current collector to the first casing member, preferably by laser welding.

The method may further include the step of confining the first anode wire extending from the first anode pellet so that it does not extend laterally beyond the inner and outer major face walls thereof. The second anode wire extends from the second anode pellet such that it does not extend laterally beyond the outer major face wall of the second anode pellet and the outer major face wall of the first anode pellet.

The method may further include the step of enclosing each of the first and second anode pellets within a separator. The method may further include the step of placing the anode assembly in a mold interior and injecting a polymeric material into the mold to enclose and immobilize a major portion of the feedthrough and the adjacent anodes.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 9 is an exploded view of a first dual anode capacitor prior to the anode/cathode assembly being inserted into the capacitor and sealed therein;

FIG. 10 is a cross sectional view of the cover-to-casing seal of the enclosure of the capacitor of FIG. 9;

Figure 1:
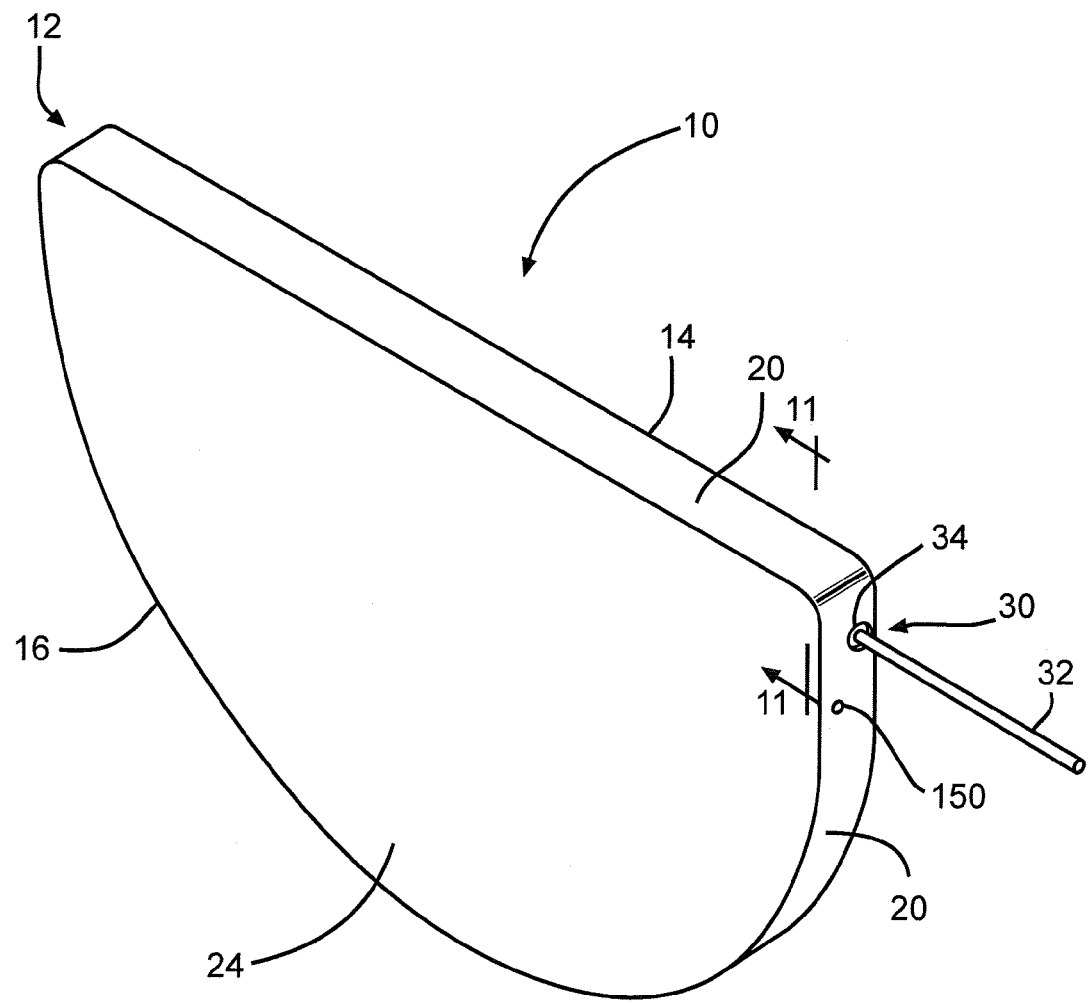
FIG. 1 is a perspective view of a capacitor 10 according to the present invention.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements.

As used herein, the term "wire" refers to a metal structure in the form of a relatively slender rod that does not extend laterally beyond the surrounding edge formed between the opposed major faces of an anode pellet.

FIG. 1 is a perspective view of a capacitor according to the present invention. The capacitor 10 comprises at least two anodes of an anode active material and a cathode of a cathode active material housed inside a hermetically sealed casing 12. The capacitor electrodes are operatively associated with each other by a working electrolyte (not shown) contained inside the casing. The anodes, cathode, and electrolyte of capacitor 10 will be described in detail hereinafter.

As particularly shown in FIGS. 1, 9 and 10, the casing 12 is of metal material comprising first and second casing members 14 and 16. First casing member 14 comprises a first face wall 18 joined to a surrounding side wall 20 extending to an edge 22. Second casing member 16 is in the shape of a plate and comprises a second face wall 24 having a surrounding edge 26. The casing members 14 and 16 are hermetically sealed together by welding the overlapping edges 22 and 26 where they contact each other. The weld 28 is provided by any conventional means; however, a preferred method is by laser welding.

Figure 2:
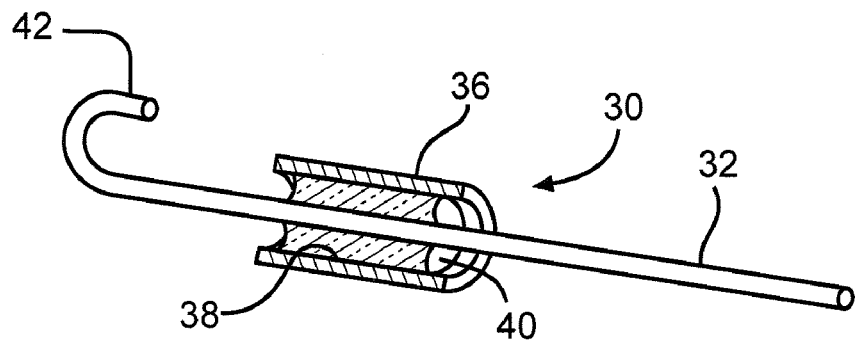
FIG. 2 is a cross-sectional perspective view of one embodiment of a feedthrough 30 used in the capacitor 10.

FIG. 2 is a cross-sectional perspective view of a feedthrough 30 that electrically insulates an anode terminal wire 32 from the casing 12. The terminal wire 32 extends from within the casing 12 to the outside thereof. The location of a hole 34 in the surrounding side wall 20 of the casing member 14 into which the feedthrough 30 is mounted is preferably offset towards the front edge 22 or towards the face wall 18 in order to align with an embedded wire of one of the anodes, as will be described subsequently.

Feedthrough 30 is a glass to metal seal (GTMS) comprising a ferrule 36 defining an internal cylindrical through bore or passage 38 of constant inside diameter. An insulative glass 40 provides a hermetic seal between the bore 38 and the anode terminal wire 32 passing therethrough. The terminal wire 32 has a J-shaped interior portion 42 for connection to one or more anode wires within casing 12. The glass 40 is, for example, ELAN® type 88 or MANSOL™ type 88.

Figure 3:
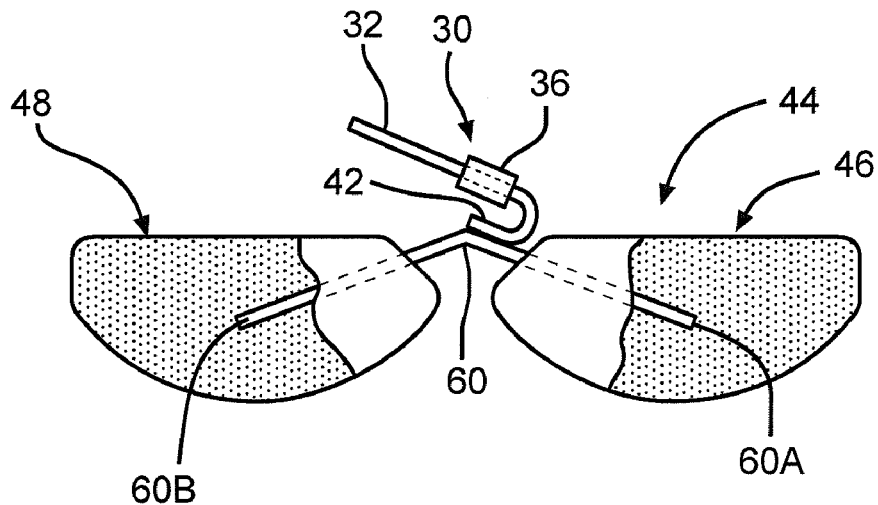
FIGS. 3 and 3A are side elevation views of anode assemblies comprising a pair of anodes connected in parallel to a feedthrough.

Capacitor 10 further comprises two or more anodes that are connected to the terminal wire 32 of feedthrough 30 within the casing 12. FIG. 3 is a side elevation view of an anode assembly 44 comprising a pair of anodes connected in parallel to the terminal wire 32. For the sake of clarity of illustration, the anode assembly 44 is depicted prior to the step of bending the connecting wires so that the faces of adjacent anodes are placed in close proximity to each other with a cathode current collector disposed there between.

Figure 11:
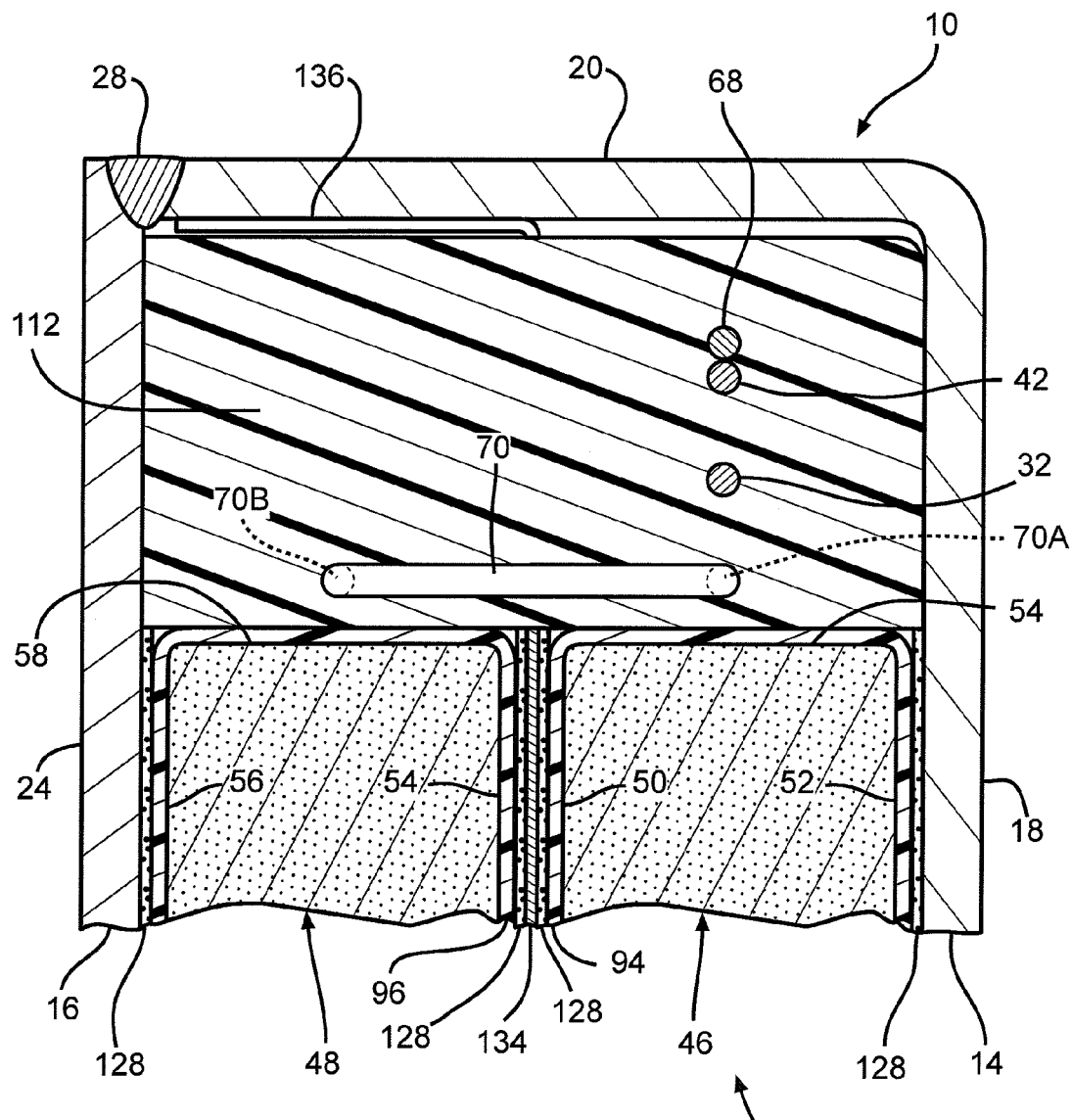
FIG. 11 is a cross sectional view taken along the line 11-11 of FIG. 1.

The anode assembly 44 includes a first anode pellet 46 and a second anode pellet 48. The first anode pellet 46 comprises an inner major face wall 50 and an outer major face wall 52, both extending to a surrounding edge 54. Similarly, the second anode pellet 46 comprises an inner major face wall 54 and an outer major face wall 56, both extending to a surrounding edge 58 (FIG. 11). An anode wire 60 has a first end portion 60A embedded in the first pellet 46 and a second end portion 60B embedded in the second pellet 48. The wire 60 is a continuous member that is electrically connected to the J-shaped interior portion 42 of the anode terminal wire by a suitable joining process, such as laser welding. This means that the first anode pellet 46 and the second anode pellet 48 are connected to the terminal wire 32 in parallel. Alternatively, the first end portion 60A and the second end portion 60B are separate wires (not shown) that are joined to the J-shaped interior portion 42 of the terminal wire 32.

Figure 3A:
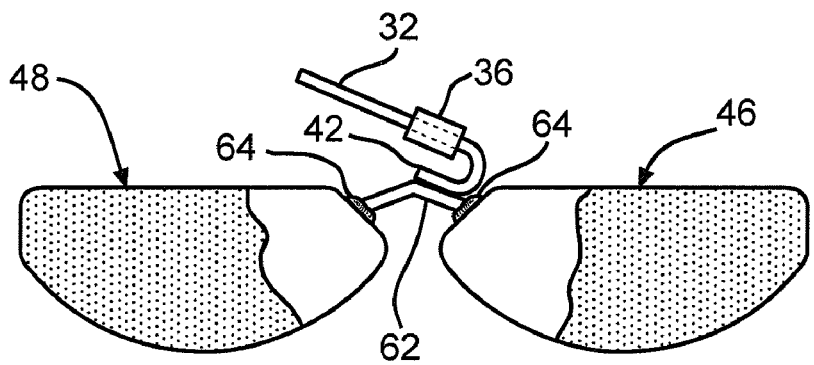

In another embodiment shown in FIG. 3A, portions of an anode wire 62 are not embedded in the anode pellets. Instead, opposed distal ends of the wire 62 are connected to the surrounding edges 54 and 58 of the respective pellets 46, 48, such as by welds 64.

Figure 4:
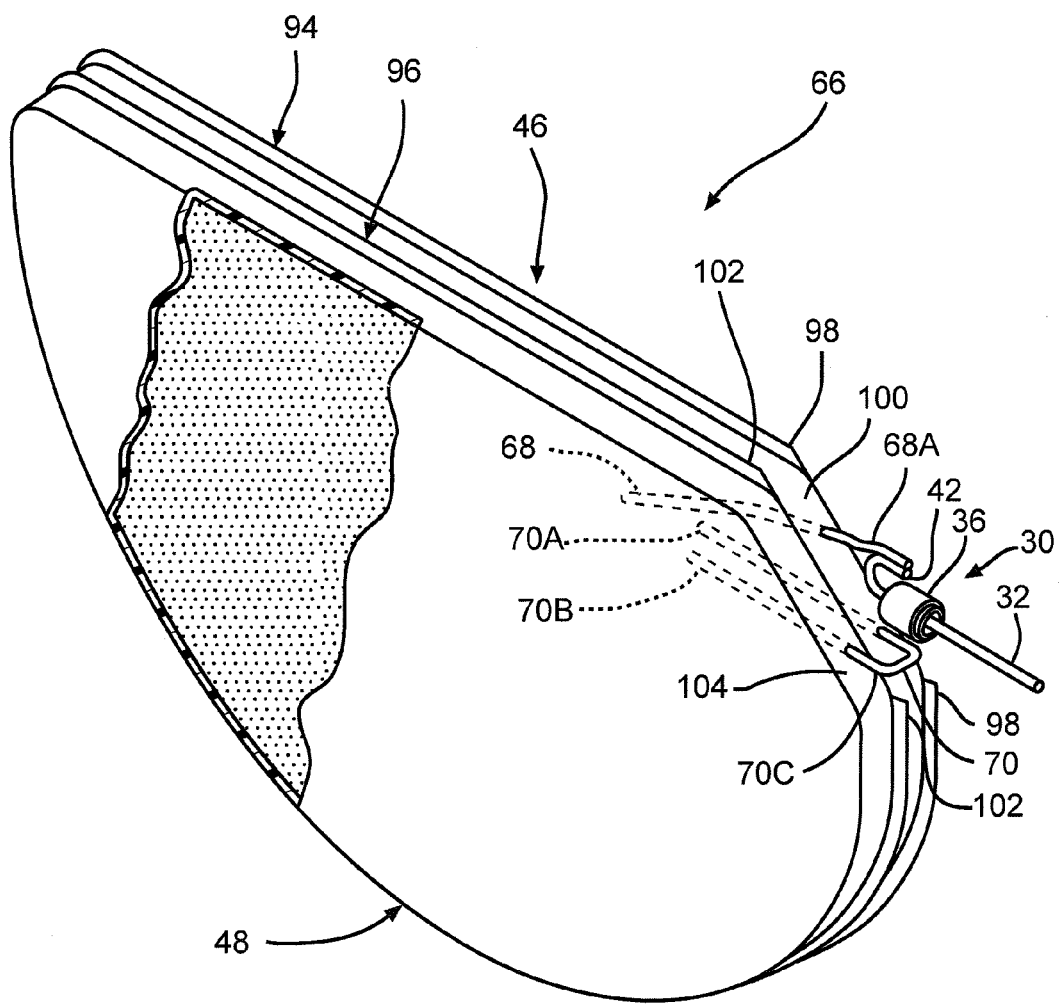
FIG. 4 is a perspective view of a dual anode assembly enclosed in separator membranes.

Referring to FIG. 4, another embodiment of the present invention is depicted therein. A dual anode assembly 66 is provided in which a wire 68 that is partially embedded in the first anode pellet 46 is electrically connected to the J-shaped interior portion 42 of the terminal wire 32. A second wire 70 has an end portion 70A embedded in the first pellet 46 and a second end portion 70B embedded in the second pellet 48. The wire 70 has an exposed U-shaped portion 70C. Thus, the U-shaped anode wire 70 is not directly connected to the terminal wire 32 or to the wire 68 of anode pellet 46. Instead, it connects directly to the first and second anode pellets 46, 48, and continuity to the embedded wire 68 is through the active material of the first anode pellet 46. In this manner, the anode pellets 46 and 48 are connected to terminal wire 32 in series.

Figure 5:
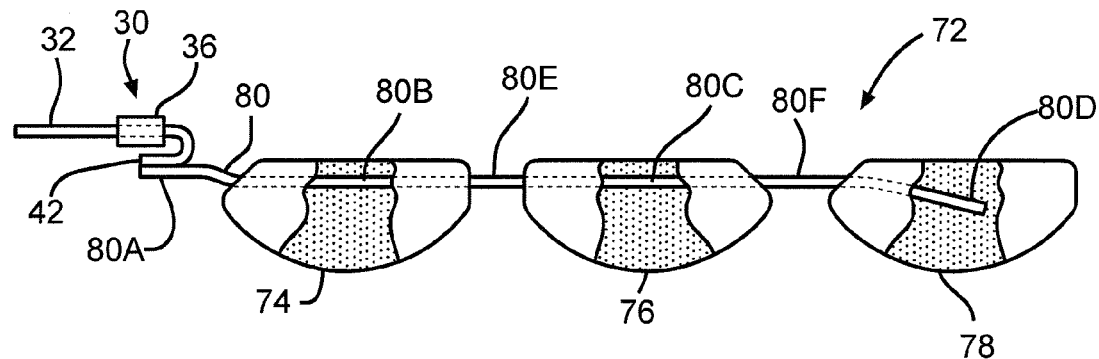
FIGS. 5 and 5A are side elevation views of an anode assemblies comprising three anodes connected in series to a feedthrough.

FIG. 5 is a side elevation view of another anode assembly 72 comprising three anodes connected in series to the terminal wire 32. Anode assembly 72 is comprised of a first anode pellet 74, a second anode pellet 76 and a third anode pellet 78. Each of the anode pellets 74, 76 and 78 is formed of active anode material and include inner and outer major face walls as described for anodes 46 and 48 of FIG. 3. An anode wire 80 is connected at its distal end 80A thereof to the feedthrough wire 32. The anode wire 80 has a portion 80B embedded in anode pellet 74, a second portion 80C embedded in the second anode pellet 76 and a third portion 80D embedded in third anode pellet 78. An exposed portion 80E of wire 80 bridges between anode pellets 74 and 76 and an exposed portion 80F bridges between anode pellets 76 and 78. Alternatively, separate embedded anode wires can be connected to pellets 74, 76 and 78 in series.

In forming anode assembly 72 for placement in casing 12, exposed anode wire portions 80E and 80F are bent to provide a serpentine arrangement or a jellyroll arrangement of anodes 74, 76 and 78. The lengths of the intermediate bridge portions 80E and 80F between the anode pellets must be matched to the particular configuration. It is to be understood that for all of the anode assemblies 44, 66 and 72, the respective anode pellets and all electrical connections between them and to the feedthrough wire 32 are housed within casing 12.

Figure 5A:
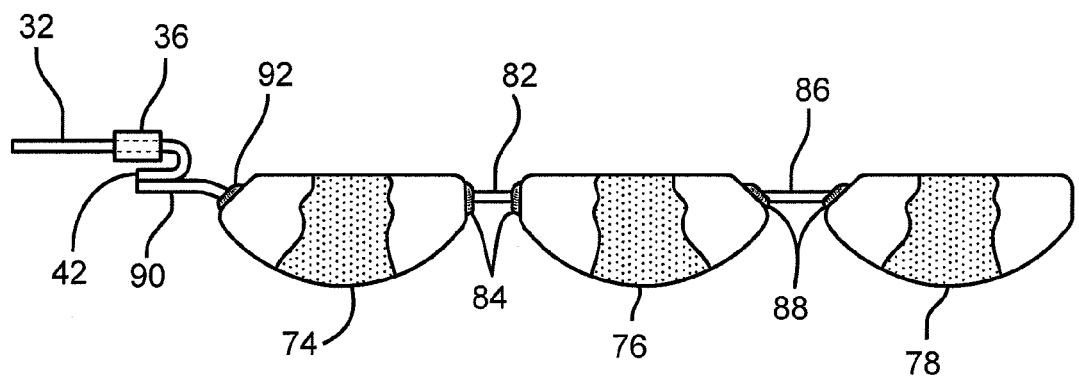

In another embodiment in FIG. 5A, portions of the anode wire 80 are not embedded in the anode pellets. Instead, opposed distal ends of a wire 82 are connected to the surrounding edges of pellets 74 and 76 by welds 80 and the opposed distal ends of a wire 86 are connected to the surrounding edges of pellets 76 and 78 by welds 88. A wire 90 is connected to pellet 74 by weld 92 opposite wire 82 with its distal end weld connected to terminal wire 42.

The anode active material of the respective anode pellets is typically of a metal selected from the group consisting of tantalum, aluminum, titanium, niobium, zirconium, hafnium, tungsten, molybdenum, vanadium, silicon, germanium, and alloys and/or mixtures thereof in the form of a pellet. As is well known by those skilled in the art, the anode metal in powdered form, for example tantalum powder, is compressed into a pellet having the previously described anode wires 60, 70 and 80 embedded therein and extending therefrom. The anode pellet is sintered under a vacuum at high temperatures. The porous pellet is then anodized in a suitable electrolyte. This serves to form a continuous dielectric oxide film thereon. The anode assembly comprising the pellet and wire are then formed to a desired voltage to produce an oxide layer over the sintered body and the anode wire. The anode can also be of an etched aluminum or titanium foil.

The capacitor 10 preferably comprises separators of electrically insulative material that completely surround and envelop the anodes. For example, the anode assembly 66 shown in FIG. 4 comprises a first separator 94 enclosing the first anode 46 and a second separator 96 enclosing the second anode 48. The separators 94 and 96 may be formed as pouches that enclose the anode pellets 46 and 48. In particular, separator 94 is sealed at a flap 98 of material that extends around the majority of the perimeter of anode pellet 46 except in a beveled region 100 proximate to feedthrough wire 32 and embedded wires 68 and 70. In like manner, separator pouch 96 is sealed at a flap 102 of material that extends around the majority of the perimeter of anode pellet 48 except in a beveled region 104 thereof. The individual sheets of separator material are closed at flaps 98 and 102 by a process such as ultrasonic welding, or heat sealing.

The separators 94 and 96 prevent an internal electrical short circuit between the anode and cathode active materials in the assembled capacitor and have a degree of porosity sufficient to allow flow therethrough of the working electrolyte during the electrochemical reaction of the capacitor 10. Illustrative separator materials include woven and non-woven fabrics of polyolefinic fibers including polypropylene and polyethylene, or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials.

Suitable microporous films include a polyethylene membrane commercially available under the designation SOLUPOR®, (DMS Solutech); a polytetrafluoroethylene membrane commercially available under the designation ZITEX®, (Chemplast Inc.) or EXCELLERATOR®, (W. L. Gore and Associates); a polypropylene membrane commercially available under the designation CELGARD®, (Celgard LLC); and a membrane commercially available under the designation DEXIGLAS®, (C. H. Dexter, Div., Dexter Corp.). Cellulose based separators also typically used in capacitors are contemplated by the scope of the present invention. Depending on the electrolyte used, the separator can be treated to improve its wettability, for example with a surfactant, as is well known by those skilled in the art.

Figure 6:
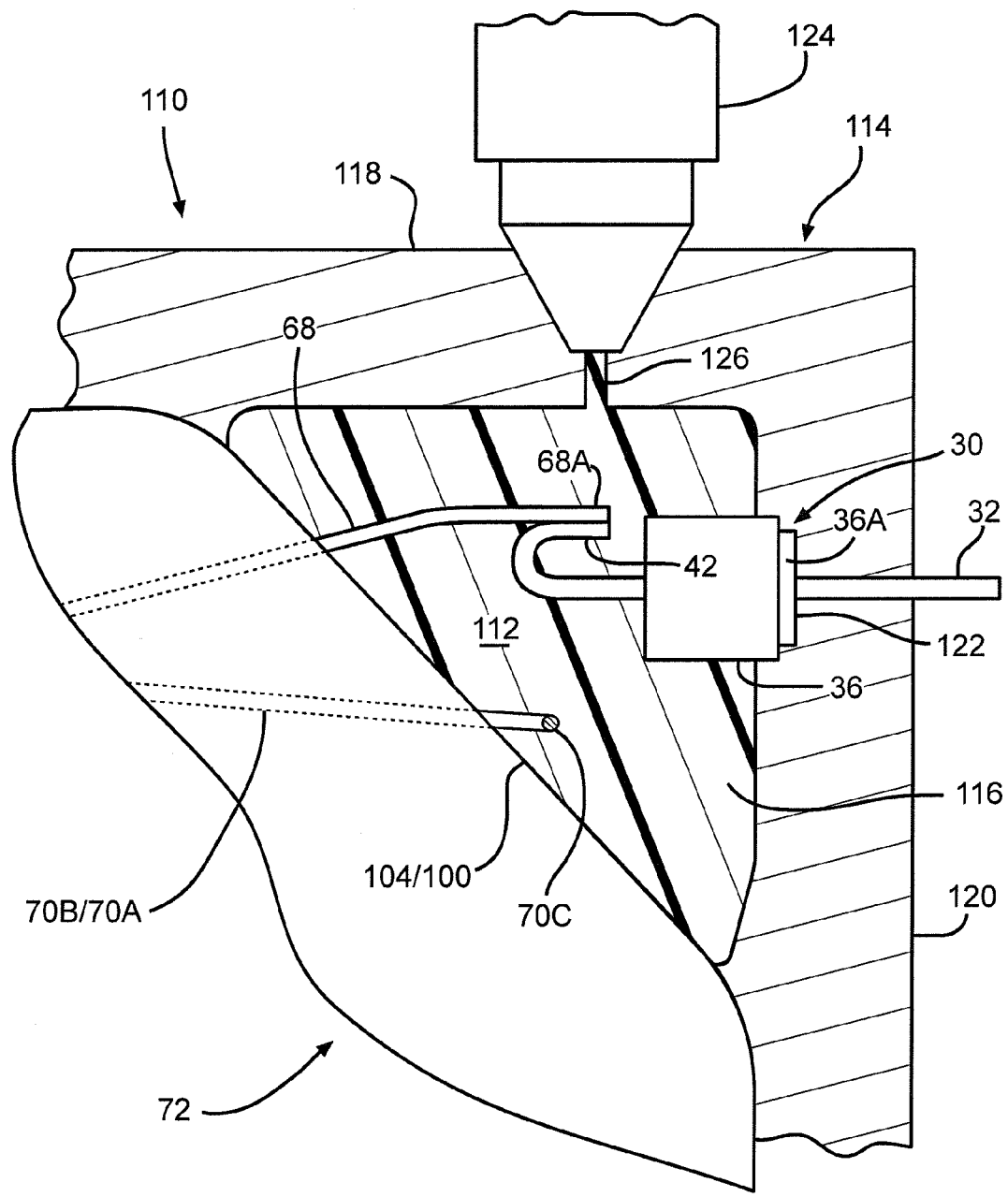
FIG. 6 is a cross-sectional view of the feedthrough of the dual anode assembly of FIG. 4 positioned in a mold 110 and having polymeric material 112 injected therein to immobilize the feedthrough.

In providing any of the anode assemblies 44, 66 or 72, an additional step may be performed in which the bridge portions of the embedded wires and a major portion of the feedthrough wire 32 including the feedthrough 30 are enclosed in a molded polymeric material. FIG. 6 is a cross-sectional view of the feedthrough of the dual anode assembly of FIG. 4 positioned in a mold 110 and having polymeric material 112 injected therein to immobilize the feedthrough and the exposed embedded wires. When the anode assembly 72 is placed in the mold 110, a corner region 114 of the mold forms a triangular shaped hollow cavity 116 bounded by mold walls 118 and 120 and the beveled regions 100 and 104 of anode pellets 46 and 48. Cavity 116 contains the external portion of embedded wire 68 including its distal end 68A, a major portion of feedthrough 30, and the U-shaped anode wire 70. The mold wall 120 is provided with a stepped cylindrical recess 122 that accepts the outer end 36A of the feedthrough ferrule 36 so that the outer ferrule end is not potted in the injected polymer.

After anode assembly 72 is fitted within mold 110, a nozzle or extrusion slot die 124 is hooked up to the mold. The nozzle 124 is used to inject a polymer material 112 through port or slot 126 into the hollow cavity 116. If desired, there can be more than one nozzle positioned to inject polymer 112 into the cavity. The polymeric material 112 is preferably of a fast curing type including a polyolefin, a fluoropolymer, a hot melt adhesive, or a UV curable adhesive. A relatively slow curing silastic material is also useful. This forms a polymeric cradle (see also FIGS. 7 to 9) around the external portion of embedded wire 68 including its distal end 68A, a major portion of the feedthrough 30 and the U-shaped portion 70C of anode wire 70, thereby enclosing and immobilizing these components.

The U-shaped anode wire 70 bridging between anode pellets 46, 48 and the feedthrough of wire 32 including its J-shaped portion 42 joined to the distal end 68A of wire 68 are enclosed and immobilized within the molded polymer 112. The various anode wires, whether embedded or not, are preferably positioned near the central regions of the respective anode pellets 46 and 48, i.e., equidistant from the inner and outer face walls of the pellets. It can be seen that the wire 68 extending from the first anode pellet 46 does not extend laterally beyond the inner face wall 50 and the outer major face wall 52 thereof. Further, the wire portions 70A, 70B embedded in pellets 46, 48 do not extend laterally beyond the respective outer major face walls 52, 56 thereof. Potting these wires in molded polymer 112 further confines them in this position.

The cathode of capacitor 10 comprises cathode active material 128 supported by and in contact with the face walls of the casing members. The structure of the cathode is best understood with reference to FIGS. 7 to 9 and 11. Referring first to FIG. 11, portions of the cathode active material contact the inner surfaces of the casing face walls 18 and 24. Another portion of the cathode active material is positioned intermediate the anodes 46 and 48. The cathode active material 128 intermediate the anodes 46 and 48 is supported on the opposed surfaces 130 and 132 of a current collector 134 (FIG. 7), preferably in the form of a foil.

Figure 7:
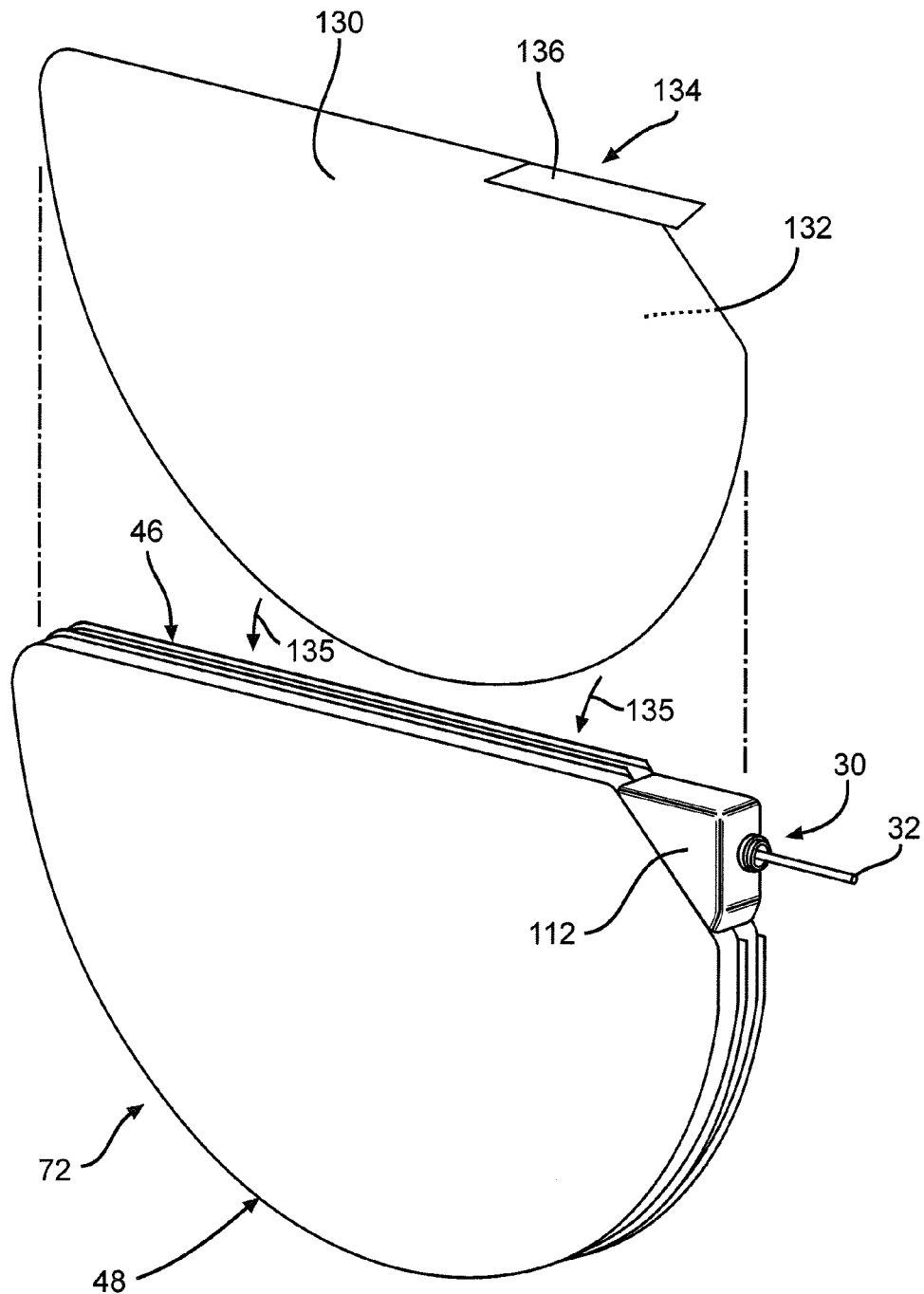
FIG. 7 is a perspective view of the dual anode assembly after injection of the polymeric material shown in FIG. 6 with a central cathode current collector being disposed between the pair of anodes.
Figure 8:
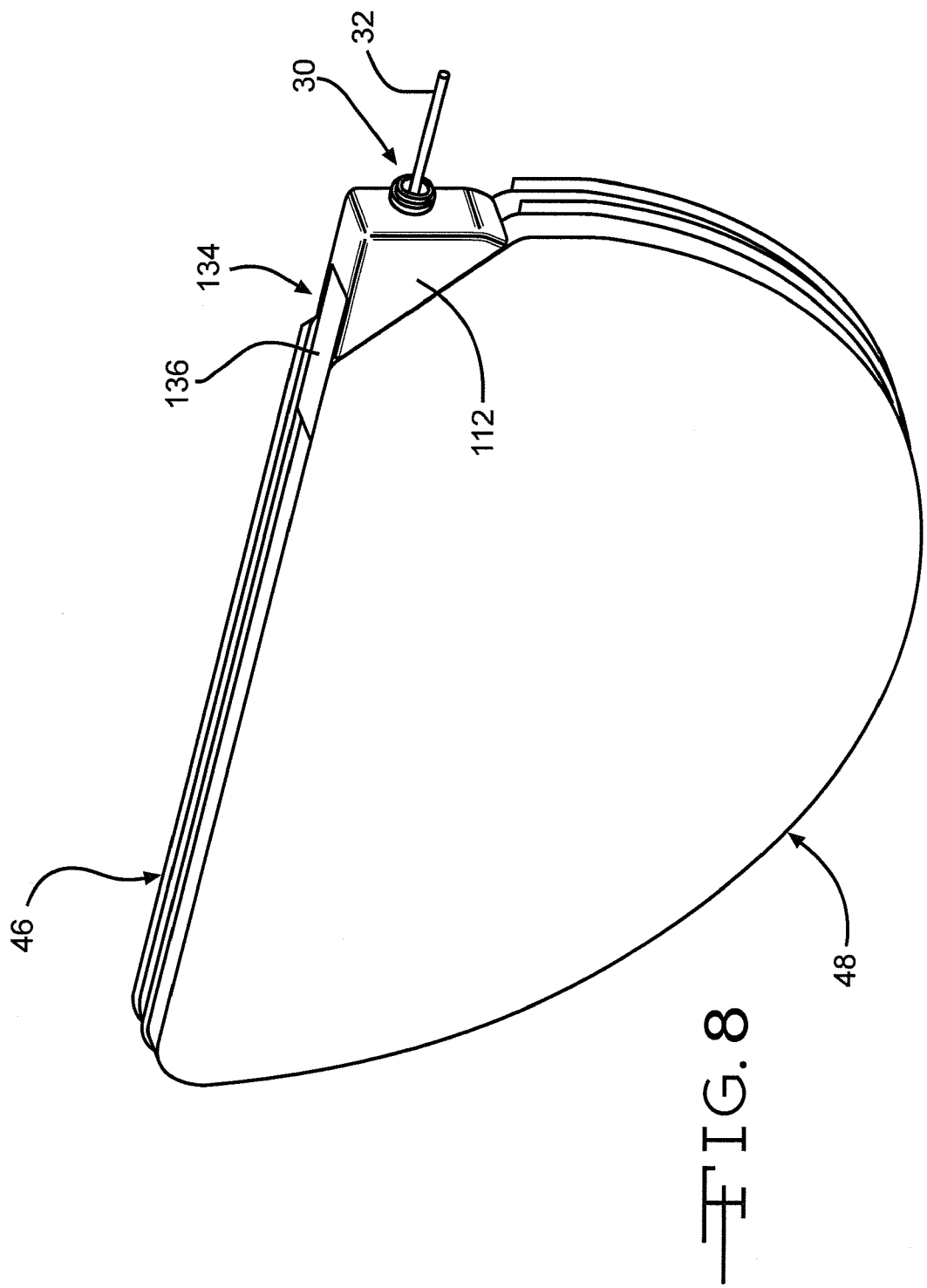
FIG. 8 is a perspective view of the anode/cathode assembly with the central cathode current collector disposed between the pair of anodes.

Although the embedded wires of anodes 46 and 48 are potted in polymer block 112, the anodes are slightly separable due to the flexibility of the embedded wires at the junction of the polymer and the anode pellets themselves. As shown in FIG. 7, anodes 46 and 48 are sufficiently separable to allow the current collector 134 to be inserted between them, as indicated by arrows 135. That way, the cathode current collector 134 having opposed first and second major faces 130 and 132 provided with cathode active material 128 thereon is positioned opposite the first and second anodes 46 and 48, thereby forming an anode-cathode assembly. A tab 136 is provided on current collector 134 for tack welding to the inner surface of the surrounding side wall 20 of casing member 14. The tab 136 is bent approximately perpendicular to the faces 130 and 132 to position it for welding to side wall 20.

The cathode active material 128 has a thickness of about a few hundred Angstroms to about 0.1 millimeters directly coated on the inner surface of the face walls 18 and 24 of casing members 14 and 16, or it may be coated on a conductive substrate (not shown) in electrical contact with the inner surface of the face walls. In that respect, the face walls 14 and 16 and the current collector 134 may be of an anodized-etched conductive material, or have a sintered active material with or without oxide contacted thereto, or be contacted with a double layer capacitive material, for example a finely divided carbonaceous material such as graphite or carbon or platinum black, or be contacted with a redox, pseudocapacitive or an under potential material, or an electroactive conducting polymer such as polyaniline, polypyrrole, polythiophene, and polyacetylene, and mixtures thereof.

According to one preferred aspect of the present invention, the redox or cathode active material includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 128 may also include a second or more metals. The second metal is in the form of an oxide, a nitride, a carbon nitride or carbide, and is not essential to the intended use of the conductive face walls 14 and 16 and the intermediate current collector 134 as a capacitor electrode, and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material includes an oxide of ruthenium or oxides of ruthenium and tantalum.

The mating casing members 14 and 16, and the electrically connected conductive substrate if it is provided, are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the face and side walls of the casing members 14 and 16 and the current collector 134 have a thickness of about 0.001 to about 2 millimeters.

The exemplary electrolytic-type capacitor 10 shown in FIGS. 1 and 11 has the cathode active material preferably coating the face walls 18 and 24, with the coating spaced from the side wall 20 of casing member 14. Such a coating is accomplished by providing the conductive face walls 18 and 24 with a masking material in a known manner so that only the intended area of the face walls is contacted with active material. The masking material is removed from the face walls prior to capacitor fabrication. Preferably, the cathode active material is substantially aligned in a face-to-face relationship with the major faces of the anodes 46 and 48.

A preferred coating process is by pad printing, as disclosed in U.S. Pat. No. 7,116,547 to Seitz et al. This patent is assigned to the assignee of the present invention and incorporated herein by reference. An ultrasonically generated aerosol as described in U.S. Pat. Nos. 5,894,403, 5,920,455, 6,224,985, and 6,468,605, all to Shah et al., is also suitable for making a coating of the active materials. These patents are assigned to the assignee of the present invention and incorporated herein by reference. In that manner, the ultrasonically generated active material contacted to the conductive surfaces has a majority of its particles with diameters of less than about 10 microns. This provides an internal surface area for the active material of about 10 m$^2$/gram to about 1,500 m$^2$/gram.

The capacitor of the present invention is not limited solely to a dual anode structure. The capacitor 10 may comprise additional anodes and cathode current collectors including cathode active material on the faces thereof. In the three anode assembly 72 of FIGS. 5 and 5A, the configuration is folded in a manner similar to that depicted for anode assembly 66 of FIG. 4, and the exposed bridge wire connectors and feedthrough may be potted with polymer material as depicted in FIGS. 6 to 9. A second cathode current collector (not shown) similar to current collector 134 of FIG. 7 is disposed between the second and third anodes 76 and 78, the second cathode current collector having opposed first and second major faces provided with cathode active material thereon. Thus, a three-anode/dual-cathode current collector assembly is provided for placement within the casing 12, as shown in FIG. 9. The welding tabs of the first and second current collectors may be offset to facilitate tack welding them individually to side wall 20 of casing member 14.

Referring again to FIG. 9, when fabrication of the anode-cathode assembly is complete, it is positioned inside the first casing member 14. The exposed outer end 36A of the feedthrough ferrule 36 is disposed in the opening 34 in side wall 20 with the distal end of terminal wire 32 extending outside the first casing member. The exposed outer end 36A of the feedthrough ferrule 36 is welded to side wall 20 to join and seal the feedthrough 30 to the casing member 14.

Tab 136 of cathode current collector 134 is then tack welded to the inside surface of casing side wall 20 to electrically connect the current collector to the casing 12. During the welding process, which is preferably done by laser welding, a piece of insulating material may be temporarily placed into the gap between tab 136 and the anode to protect the separator material and/or anode material from thermal damage.

Casing member 16 is then mated with casing member 14 and sealed thereto, preferably by laser welding. In one embodiment, the mating of casing members is as depicted in FIGS. 10 and 11. The outer surface 16A of casing member 16 is flush with the outermost edge 22 of casing member 14, and weld 28 is formed at the interface between overlapping edges 22 and 26.

Figure 12:
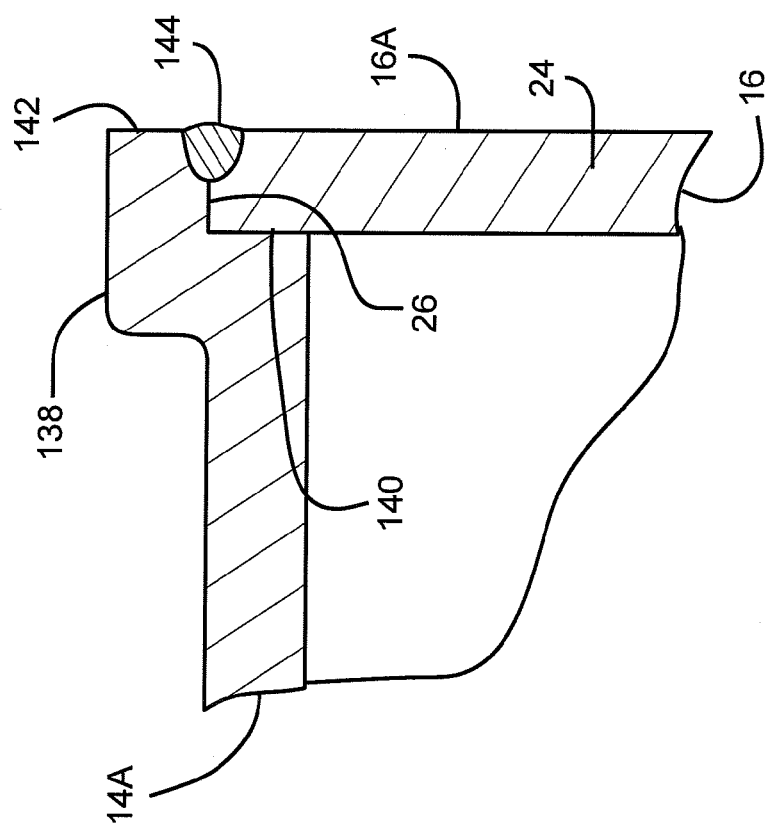

In another embodiment depicted in FIG. 12, casing member 14A is provided with an expanded flange 138. Casing member 16 is nested within flange 138 and supported by step 140 thereof so that the outer surface 16A of casing member 16 is flush with the outermost edge 142 of casing member 14A. Weld 144 is formed at the interface between the overlapping edges 26 and 142 to hermetically secure the casing members 14A, 16 together.

Figure 13:
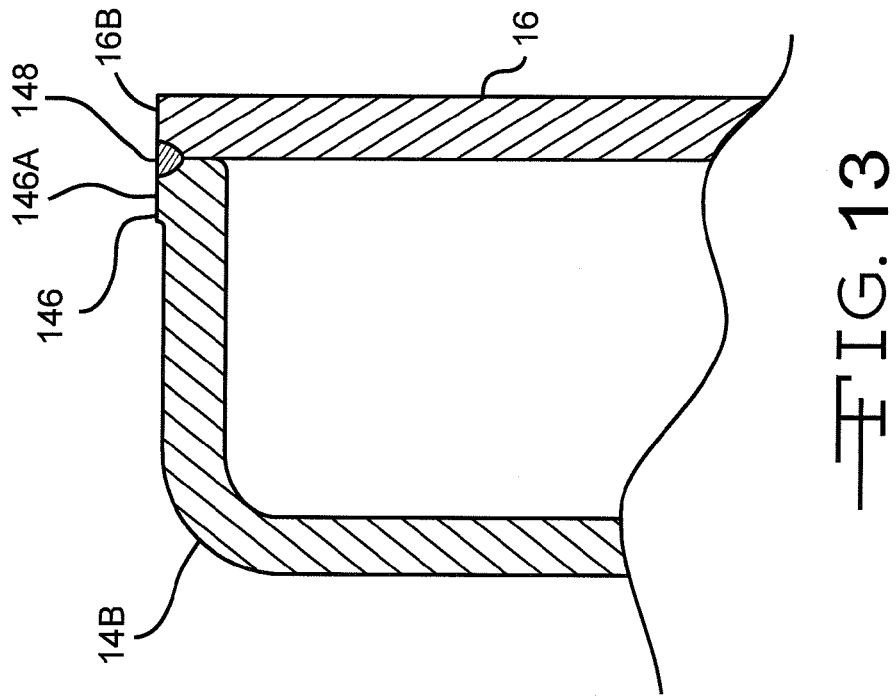
FIGS. 12 and 13 are cross-sectional views of other casing constructions useful with the present capacitor.

In the embodiment shown in FIG. 13, the casing member 14A is provided with an outwardly turned flange 146. Casing member 16 is rested on the outer edge of flange 146 so that their respective outer edges 16B, 146A are co-planar. Weld 148 is formed at the interface between the edges to hermetically secure the casing members 14B, 16 together.

For a more detailed discussion regarding various casing constructions suitable for the present capacitor, reference is made to U.S. Pat. No. 7,012,799 to Muffoletto et al. This patent is assigned to the assignee of the present invention and incorporated herein by reference.

In a final step of providing capacitor 10, the void volume in casing 12 is filled with a working electrolyte (not shown) through a fill opening 150 (FIG. 1). This hole is then welded closed to complete the sealing process. A suitable working electrolyte for the capacitor 10 is described in U.S. Pat. No. 6,219,222 to Shah et al., which includes a mixed solvent of water and ethylene glycol having an ammonium salt dissolved therein. U.S. Pat. No. 6,687,117 to Liu and U.S. Patent Application Pub. No. 2003/0090857 describe other electrolytes for the present capacitor 10. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publications are assigned to the assignee of the present invention and incorporated herein by reference It is, therefore, apparent that there has been provided, in accordance with the present invention, a capacitor containing at least two anodes that are connected to a common terminal within the capacitor casing. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A capacitor assembly, comprising:
   a) a casing comprising first and second casing members secured to each other;

b) a first anode of anode active material housed within the casing;

c) a second anode of anode active material housed within the casing, wherein the first anode is electrically connected in parallel to the second anode by a first anode wire having opposite ends contacting the respective first and second anodes;

d) a feedthrough wire extending outside the casing and electrically isolated there from, wherein the feedthrough wire is electrically connected to the first anode wire intermediate the first and second anodes;

e) a cathode comprising cathode active material supported by and in contact with a first face wall of the first casing member and a second face wall of the second casing member;

f) a first cathode current collector disposed between the first and second anodes and having opposed first and second major faces provided with cathode active material thereon; and g) an electrolyte contacting the cathode and the first and second anodes.

2. The capacitor assembly of claim 1 wherein the first anode comprises a first surrounding sidewall extending to opposed first face walls and the second anode comprises a second surrounding sidewall extending to opposed second face walls and wherein the first anode wire extends to the first and second surrounding sidewalls.

3. The capacitor assembly of claim 1 wherein the opposite ends of the first anode wire are embedded in the respective first and second anodes.

4. The capacitor assembly of claim 1 wherein the feedthrough wire is connected to the first anode wire.

5. The capacitor assembly of claim 1 wherein the feedthrough wire is connected to a second anode wire extending from the first anode.

6. The capacitor assembly of claim 1 wherein the first casing member has a first face wall joined to a surrounding side wall and the second member has a second face wall secured to the surrounding side wall of the first casing member.

7. The capacitor assembly of claim 1 further comprising a first separator enclosing the first anode and a second separator enclosing the second anode.

8. The capacitor assembly of claim 1 wherein the feedthrough wire is insulated from the casing by a glass-to-metal seal.

9. The capacitor assembly of claim 1 wherein at least a portion of the first anode wire extending to the first and second anodes and at least a portion of the feedthrough wire including a glass-to-metal seal are enclosed in a polymeric material.

10. The capacitor assembly of claim 1 wherein the anode active material is selected from the group consisting of tantalum, aluminum, titanium, niobium, zirconium, hafnium, tungsten, molybdenum, vanadium, silicon, germanium, and mixtures and alloys thereof, and the cathode active material is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, and mixtures, oxides and nitrides thereof.

11. A capacitor assembly, comprising:

a) a casing comprising first and second casing members secured to each other;

b) a first anode of anode active material housed within the casing;

c) a second anode of anode active material housed within the casing, wherein the first anode is electrically connected in series to the second anode by a first anode wire extending from the second anode to the first anode;

d) a feedthrough wire extending outside the casing and electrically isolated there from, wherein the feedthrough wire is electrically connected to the first anode;

e) a cathode comprising cathode active material supported by and in contact with a first face wall of the first casing member and a second face wall of the second casing member;

f) a first cathode current collector disposed between the first and second anodes and having opposed first and second major faces provided with cathode active material thereon; and g) an electrolyte contacting the cathode and the first and second anodes.

12. The capacitor assembly of claim 11 wherein the first anode comprises a first surrounding sidewall extending to opposed first face walls and the second anode comprises a second surrounding sidewall extending to opposed second face walls and wherein the first anode wire extends to the first and second surrounding sidewalls.

13. The capacitor assembly of claim 11 wherein the feedthrough wire is electrically connected to the first anode wire extending from the first anode opposite the second anode.

14. The capacitor assembly of claim 11 wherein the feedthrough wire is electrically connected to a second anode wire extending from the first anode opposite the second anode.

15. The capacitor assembly of claim 14 wherein the second anode wire is embedded in the first anode.

16. The capacitor assembly of claim 14 wherein the second anode wire is not embedded in the first anode, but is contacted thereto.

17. The capacitor assembly of claim 11 wherein a third anode is electrically connected to the second anode by a third anode wire extending between the second and third anodes.

18. The capacitor assembly of claim 17 wherein opposite ends of the third anode wire are embedded in the second and third anode pellets.

19. The capacitor assembly of claim 17 wherein opposite ends of the third anode wire are not embedded in the second and third anodes, but are contacted thereto.

20. The capacitor assembly of claim 11 further comprising a first separator enclosing the first anode and a second separator enclosing the second anode.

21. The capacitor assembly of claim 11 wherein the feedthrough wire is insulated from the casing by a glass-to-metal seal.

22. The capacitor assembly of claim 11 wherein at least a portion of the first anode wire and at least a portion of the feedthrough wire including a glass-to-metal seal are enclosed in a polymeric material.

23. The capacitor assembly of claim 11 wherein the anode active material is selected from the group consisting of tantalum, aluminum, titanium, niobium, zirconium, hafnium, tungsten, molybdenum, vanadium, silicon, germanium, and mixtures and alloys thereof, and the cathode active material is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, and mixtures, oxides and nitrides thereof.

24. The capacitor assembly of claim 11 wherein the first casing member has a first face wall joined to a surrounding side wall and the second member has a second face wall secured to the surrounding side wall of the first casing member.

25. The capacitor assembly of claim 11 further comprising a first separator enclosing the first anode and a second separator enclosing the second anode.

26. A method for providing a capacitor assembly, comprising the steps of:
   a) providing a casing comprising a first casing member and a second casing member, each of the casing members including a face wall supporting and in contact with cathode active material;
   b) providing a first anode of anode active material comprising inner and outer face walls and a second anode of anode active material comprising inner and outer face walls;
   c) electrically connecting the first anode to the second anode in parallel by a first anode wire having opposed ends contacting the respective first and second anodes;
   d) connecting a feedthrough wire to the first anode wire intermediate the first and second anodes;
   e) disposing a current collector having opposed first and second major faces provided with cathode active material between the first and second anodes, thereby forming an anode-cathode assembly;
   f) positioning the anode-cathode assembly inside the first casing member with the feedthrough wire extending outside the first casing member and electrically insulating there from, and electrically connecting the cathode current collector to the first casing member;
   g) securing the first casing member to the second casing member to provide an enclosure containing the anode-cathode assembly; and
   h) providing an electrolyte inside the casing to operatively associate the cathode with the first and second anodes.

27. The method of claim 26 including providing the first anode comprising a first surrounding sidewall extending to opposed first face walls and the second anode comprising a second surrounding sidewall extending to opposed second face walls and wherein the opposed ends of the first anode wire contact the respective first and second surrounding sidewalls.

28. The method of claim 26 including connecting the feedthrough wire to the first anode wire.

29. The method of claim 26 including connecting the feedthrough wire to a second anode wire extending from the first anode.

30. A method for providing a capacitor assembly, comprising the steps of:
   a) providing a casing comprising a first casing member and a second casing member, each of the casing members including a face wall supporting and in contact with cathode active material;
   b) providing a first anode of anode active material comprising inner and outer face walls and a second anode of anode active material comprising inner and outer face walls;
   c) electrically connecting the first anode to the second anode in series by a first anode wire extending from the second anode to the first anode;
   d) electrically connecting a feedthrough wire to the first anode;
   e) disposing a current collector having opposed first and second major faces provided with cathode active material between the first and second anodes, thereby forming an anode-cathode assembly;
   f) positioning the anode-cathode assembly inside the first casing member with the feedthrough wire extending outside the first casing member and electrically insulating there from, and electrically connecting the cathode current collector to the first casing member;
   g) securing the first casing member to the second casing member to provide an enclosure containing the anode-cathode assembly; and
   h) providing an electrolyte inside the casing to operatively associate the cathode with the first and second anodes.

31. The method of claim 30 including providing the first anode comprising a first surrounding sidewall extending to opposed first face walls and the second anode comprising a second surrounding sidewall extending to opposed second face walls and further providing the first anode wire extending to the first and second surrounding sidewalls.

32. The method of claim 30 including electrically connecting the feedthrough wire to the first anode wire extending from the first anode opposite the second anode.

33. The method of claim 30 including electrically connecting the feedthrough wire to a second anode wire extending from the first anode opposite the second anode.

34. The method of claim 30 further including providing a third anode electrically connected to the second anode by a third anode wire extending between the second and third anodes.

* * * * *